United States Patent Office 2,836,585
Patented May 27, 1958

2,836,585

PROCESS FOR POLYMERIZING A VINYL HALIDE POLYMER IN THE PRESENCE OF GELATIN

Archie Hill, Painesville, Ohio, assignor to Diamond Alkali Company, Cleveland, Ohio, a corporation of Delaware No Drawing. Application March 26, 1954
Serial No. 419,111

9 Claims. (Cl. 260—92.8)

This invention relates to the production of synthetic resins, and is more particularly concerned with the production of resins comprising polyvinyl chloride.

The invention is concerned primarily with improvements in what is known as "granular" polymerization. Granular polymerization is known also as "pearl" polymerization and "suspension" polymerization; the three terms are synonymous. More particularly, the invention is concerned with the production of high-quality general-purpose polymeric material by the granular polymerization method, such that the stock material so produced may be employed, in the vast majority of cases, for whatever purpose and in whatever manner may be desired. Those skilled in the art will recognize the ambitiousness of the undertaking because of the multiplicity of characteristics that are necessary in order for a stock material to be so generally acceptable. Although the invention is not restricted to the polymerization of a single monomeric material, for purposes of simplicity, the description of the invention is centered upon the production of polyvinyl chloride, the properties thereof that characterize high-quality general-purpose stock material, problems that have been encountered in the past in its production, and the improvements wrought by this invention whereby those problems are overcome.

The general procedure that is followed in carrying out polymerization reactions according to the granular polymerization method is now well known to involve the suspension of the monomer in water and, while suspended, effecting polymerization. Heat and catalysts are employed as polymerization aids and the suspension is maintained during the course of the reaction by stabilizing the system with one or more of a number of materials known as suspension stabilizers, for example, methyl cellulose, polyvinyl alcohol, sodium alginates, gum tragacanth and the like. When the polymerization reaction is complete, in well handled processes, a goodly portion of the polymer may be recovered in particle or granular form by filtration or centrifugation without the aid of any additional specific means. The product is thereafter washed and dried, after which it is ready for market. This type of process has several outstanding advantages over the process of polymerizing which is known as "emulsion" polymerization.

Emulsion polymerization is conducted in a system in which the monomeric material is dispersed in water by means of a surface-active agent to form a true emulsion. Polymerization is carried out with the aid of heat and a water-soluble catalyst. The procedure differs from suspension polymerization in many respects, not the least important of which is the use of a water-soluble catalyst. Normally, suspension polymerization employs only oil-soluble catalysts.

At the conclusion of the emulsion polymerization, the polymerization product remains dispersed in the system as a finely divided mass that is referred to as a latex. In order to recover the product, it is necessary to effect coagulation of the latex whereby the emulsion system is broken and the polymer is precipitated. This may be accomplished by adding an electrolyte to the latex but such addition of electrolyte is usually undesirable for reasons to be stated. Accordingly, mechanical means may be resorted to in order to break the emulsion. However, even if mechanical means are used to break the emulsion, the residual electrolyte from both the catalyst and the emulsifying agents is still associated with the precipitated polymer.

The precipitate is extremely difficult to wash free of electrolytes whether present for polymerization or coagulation purposes. Hence, the final product usually contains impurities which render it quite inferior for a number of its important uses. In particular, it is almost impossible to prepare a material of good clarity such as is most desirable for use in preparing films and sheets. Secondly, where the product is to be employed in certain electrical applications, its dielectric properties are severely impaired even where great care is employed in washing the product. The objectionable materials cannot be removed to the necessary extent without applying lengthy washing procedure. Depending upon the degree of impurities present, strength properties of the product may be impaired. Because of the difficulty of washing the precipitate, emulsion polymerization is costly and it is primarily because of this and the above-noted disadvantage that attention in recent years has been directed to a greater degree toward the granular polymerization method. This latter method, as indicated above, when managed properly, results in the formation of a granular mass that may be washed free of impurities with ease and quite simply dried.

There are many variations of the granular polymerization method generally described above. These variations appear in the art because of specific difficulties that are encountered in its practice. The simple change from emulsion polymerization to granular polymerization does not lead to problem-free operation. In fact, some of the difficulties that are encountered in emulsion polyemrization are encountered also in granular polymerization, notably, the production of a stock material which, when processed to form products, contain what is known to the art as "fisheyes." In the production of a high-quality general-purpose polymeric material, it is perhaps misdescriptive to refer to any particular disadvantage as being most important. However, if any single one is most important, the disadvantage of fisheye formation is it. This is because of the fact that all products formed from fisheye-producing polymeric stock are inferior in quality in several important functional aspects, depending upon the number and size of fisheyes present.

Fisheyes may be visualized as small blotches, actually having the appearance of the eyes of a fish, in the final plasticized polymeric product. They are believed to result from the failure of some of the individual particles of the polymer stock to associate with the plasticizer. Thus, as to substance, they are merely small particles of polymer surrounded by relatively large seas of plasticizer. Since the plasticized material is intended to be homogeneous, fisheyes indicate poor homogeneity and are imperfections in the final product. A relatively small number of fisheyes can be tolerated in the final product; in fact, it appears impossible to eliminate them completely by any process. The seriousness of their presence in large numbers may be indicated by the following comments which refer to the undesirable effects that they have.

Excellent transparency of polyvinyl chloride in some applications, for example, sheets and films, is an absolute necessity, both functionally and appearance-wise. Where such products contain a substantial number of fisheyes, they are not clear and transparent; instead, they present a hazy appearance and may be degraded in clarity to the point of mere translucency. As noted above, dielectric strength in some electrical applications is important and where the product contains many fisheyes, it is unsuitable for these uses because of the reduced dielectric strength. Additionally, fisheyes result in the formation of a rough, uneven surface which cannot be smoothed. Products containing fisheyes are low in structural strength; especially the tear resistance of polyvinyl chloride sheets is seriously impaired. Fisheyes are undesirable for still other reasons which need not be mentioned in view of the ones above noted.

The problem of fisheyes can hardly be over-emphasized. Their presence has been studied extensively by most highly skilled artisans who recognize them as being the most serious single problem in the production of high quality polyvinyl chloride products. As will appear from the discussion hereinafter of the present invention, the premise suggested above provides a reasonably valid point of departure from which their presence may be understood and controlled.

While, as noted above, the polymeric mass that is produced by a properly managed granular polymerization method may be quite easily and quickly washed free of impurities and is easily dried, it is extremely difficult to control the particle size of the granular mass that is formed, whereby such ease of washing and drying is attained. From the standpoint of operating efficiency, and thus the commerical advantage in low costs that the granular polymerization process affords, the problem of particle size is equally as serious as the problem of fisheyes. In the first place, it will be recalled from the foregoing paragraphs that the polymerized product must be separated from the aqueous medium. This may be accomplished by usual filtration or centrifuging methods provided that the product is within a suitable particle size range. If the particle size is too small, separation will be difficult and extremely slow and, in fact, may be impossible in the practical sense. A mass of small particles holds the occluded suspending medium and prevents its release from the mass. Also, the particles themselves may pass through the filter along with the liquid. On the other hand, if the particle size is too large or if the particles are not of a uniform desired size, serious obstacles are encountered in processing the polymer to its final product stage. Because of the processing requirement for handling larger particles, an inferior product results.

For example, in processing polyvinyl chloride to sheet form, it is customary to admix with it a plasticizer and deliver it to a milling machine such as the well-known roll mill which works the mixtures to homogeneity. It has been found that polyvinyl chloride deteriorates quite markedly during this processing stage if it is permitted to remain in contact with the hot rolls beyond a limited time. Large particles of polymer must be worked longer than small or medium particles and thus require a greater residence time in the mill. Accordingly, products formed from large particle size polymer tend to suffer in their physical properties, such as color and heat stability. A mass of non-uniform size, that is to say, one containing particles of acceptable size and particles of a size that are regarded normally as too large, presents a similar difficulty because the polymer must remain upon the mill until all particles have been equally plasticized in order to obtain a homogeneous product.

Various attempts have been made to explain the reason for the formation of large globules or agglomerates of the polymer. It has been reported that during the polymerization reaction, the mass passes through a sticky, tacky state which is not broken up completely in the succeeding phase of the reaction and that violent agitation only seems to increase the tendency toward agglomeration. Also, it is reported that the reaction rate and the temperature in the reaction zone is thought to be responsible for the problem. These possibilities need not be denied here as they may be entirely valid assumptions when considered in the light of the particular process in which they originate. However, it is suggested herein that the proper approach to solving the problem of uniform particle size resides in the basic suspension system itself, and that, if the suspension system is proper, a preferred particle size can be obtained, and other conditions, such as temperature, reaction rate and agitation stand reduced in power of influence upon particle size.

It may be said in respect of such other explanations and the mentioned conditions that unquestionably there appears to be optimum reaction rates, temperature limits and conditions of agitation which desirably should be correlated with a basic suspension system and such are indicated hereinafter in connection with the process of this invention. It should be noted that among the most important properties generally regarded as requisite in high-quality general-purpose polyvinyl chloride are good dielectric properties, good heat stability, good plasticizer compatibility under processing conditions, high strength properties, good clarity and color, high bulk density and good processability. As noted above in part, these properties, for the most part, are either attained or fallen short of, depending upon the control of fisheyes and particle size and, further, as noted above, these two conditions depend in turn upon the operating techniques that are employed in the granular polymerization process.

According to this invention, these prominent difficulties are overcome, and a product fulfilling all of the recited characteristics is produced and the process of the invention provides still other advantages that those skilled in the art will recognize.

Briefly stated, the process of this invention comprises carrying out the polymerization reaction from an initial water-monomer mixture wherein the monomer is maintained in suspension with the assistance of gelatin as a suspension stabilizer while controlling the pH of the mixture whereby certain desirable dispersion characteristics are effected in the suspension system. The reaction is carried out with agitation and with other conditions and precautions as indicated hereinafter in greater detail. The use of gelatin as a suspension stabilizer is not novel to the art as will now appear.

Numerous attempts have been made by highly skilled chemists to polymerize vinyl chloride with the aid of gelatin as a suspension stabilizer whereby a product such as is sought herein, may be produced. According to recurring indications in the literature, it seems to be well-established that a system including gelatin as the sole suspension aid falls far short of what is required in the industry and that the serious problems mentioned above attend its use. It was reported very early in the literature that gelatin is a suitable suspension stabilizer. However, experimental operations in accordance with the broad early teachings serve only to reveal the serious difficulties described above. While other investigators in the field of synthetic resins have also noted the deficiency of the teachings of the prior art, they have, on the other hand, reported allegedly successful processes wherein gelatin is employed in conjunction with other assisting additives, successful at least to the point that one of the above-noted serious disadvantages are said to be obviated. Accordingly, it seems apparent that the process by which high-quality general-purpose polyvinyl chloride is produced is considerably more intricate than the early investigators perceived and that the early teachings, unfortunately, have misinformed the art to its detriment.

According to this invention, it has been discovered in the very face, so to speak, of the difficulties of the sundry prior teachings that a high-quality general-purpose product, notably, polyvinyl chloride, can be produced by carrying out the polymerization reaction in the presence of a small controlled quantity of gelatin as the suspension stabilizer while maintaining the pH in the system throughout the reaction below or on the acid side of the isoelectric point of the gelatin.

Gelatin is known to be an exceedingly complex proteinaceous substance which is derived from animal substance by various processes. The material is commercially available in three slightly different forms, all of which are useful in the practice of this invention. These forms are a so-called acid hydrolysis product, a so-called alkali (i. e., lime) hydrolysis product, and a non-ionized form obtained by hot water hydrolysis of animal substance. These materials, as supplied commercially, vary slightly in their isoelectric pH's, namely from about 7 to 8.2 for the acid product, about 4.8 to 5 for the alkali product, and about 4.7 for the non-ionized form. While the present invention may be practiced employing any of these three forms of gelatin, the alkali hydrolysis material has been found to have excellent usefulness. This material in water solution assumes a pH of 5.5 to 6.8.

Accordingly, it is a feature of the invention to conduct the polymerization employing gelatin of alkali hydrolysis as a suspension stabilizer, the polymerization system being maintained during polymerization at a pH of between about 2 and 5, and especially between about 2.5 and 4, the reaction being promoted with the aid of heat and a catalyst and continuous agitation of the suspension being maintained throughout the reaction. It appears that when employing this gelatin of alkali hydrolysis, best results are obtained when the pH in the system is maintained at between 2.7 and 3.2, which of course is substantially below the isoelectric point of the gelatin of alkali hydrolysis. At such pH, but a low concentration of gelatin is necessary.

Moreover, it has been found that in investigating polymerization at sundry pH's employing gelatin of alkali hydrolysis, as the pH is reduced to the preferred range of 2.7 to 3.2 while the same amount of gelatin apparently is necessary, an advantage arises in the polymerization in that modifications in gelatin concentration do not appear as seriously to affect the properties of the resulting product. Where the polymerization is carried out at higher pH's, on the contrary, especially those pH's at or above the isoelectric point of the gelatin, it is found that minor changes in concentrations of gelatin seriously affect the product. Accordingly, the removal of this criticality of reaction conditions is one of the chief advantages of the invention arising from carrying out the polymerization at a pH below the isoelectric point of the gelatin employed.

In addition, it has been found that the ultimately obtained product comprises particles of a size rendering them readily worked with a plasticizer and the like and, moreover, particles having high porosity, which of course is desirable from the standpoint of acceptance of the plasticizer. It is apparent from the extended experimentation leading to the present invention that the phenomenon obtained by conducting the polymerization employing gelatin as a suspending agent, and at a pH below the isoelectric point of the gelatin, is largely responsible for the advantageous results obtained particularly with respect to the production of fisheyes when the reaction is carried out in accordance with the preferred conditions hereof are minimum in number and relatively small in size.

It is not known why the process of this invention also produces a substantially uniform particle size and one that is ideally suited for filtration, centrifugation and general processing in the after-treating apparatus. However, it should be noted that a reasonably acceptable particle size, and the preferred particle size, is obtained by maintaining the gelatin within certain specified limits and that either decreasing the gelatin quantity below the lower specified quantity, or increasing the quantity above the maximum specified quantity, serves to increase the particle size of the polymer that is formed. This phenomenon may have a very simple explanation but none is at hand for expression here.

Also, it may be noted that while an ecceptable particle size is obtained within the limits specified herein for gelatin concentration and pH, it appears that at pH's below the isoelectric point, and in the case of gelatin of alkali hydrolysis at about pH 2.7–3.2, the most readily workable particle size is obtained. It will be observed that this coincides with the pH condition specified for the greatest reduction in the number of fisheyes. Whether this fact is merely a coincidence or the two factors are relatable appears to be purely speculative at this time.

Reference herein to gelatin is for convenience and the term as employed denotes the several forms. Gelatin may suitably be added to the system in quantity of from about 0.10–0.45 percent by weight of the vinyl chloride monomer and excellent results are obtained in all respects within this range, and especially so if the pH of the system, in the case of the alkali material, is reduced to about 2.5–3.5. For example, at pH 2.8, results which are about equally good are obtained by using either about 0.10–0.15 percent or about 0.40–0.45 percent gelatin. However, at about the same pH and with gelatin concentrations of about 0.25–0.35 percent by weight of monomer, an even better result is obtained and for this reason, this latter percentage of gelatin is preferred. Numerous combinations of gelatin and pH may be employed within the range suggested herein for each, but the last-noted combination appears to be optimum.

While the process by which polyvinyl chloride resins may be prepared according to this invention involves the correlation of a substantial number of reaction conditions, the process, in the main, is not difficult to manage as a sustained commercial operation. It is necessary only to observe with care the various conditions that are described herein whereby, it is believed, a product is obtained which is equal to, if not superior to, any known commercial polyvinyl chloride product. The reaction time is not inordinately long, it requiring less than about 15 hours under preferred conditions and, if desired, the reaction can be speeded up considerably. In order that those interested in preparing resinous materials in accordance with this invention may do so with facility, it is desired to make specific reference to the several variables which are involved, and, further, to call attention to certain precautions that have been found to contribute, at least in a small way, to the overall success of the process. It will be appreciated that the conditions hereinafter referred to may be varied from a particular suggested optimum figure either because the success of the process does not depend upon the maintenance of the condition with such exactness, or because the alteration of a particular condition may be compensated for by the alteration of another condition operating concurrently. Again, it should be noted that specific conditions set forth hereinafter relate particularly to the production of polyvinyl chloride; therefore, where other resinous materials are produced, it may be found that slightly modified conditions are desirable.

As to the precautions, some of them are well-known in the art and while the complete success of the process is not dependent upon the observance of the precautions, and the invention is not limited to the application of such precautions, their observance is recommended, especially, in the production of polyvinyl chloride whereby, in some cases, a better product is produced or a particular difficulty is reduced in its magnitude.

The reaction temperatures herein suggested do not appear to have any significant effect upon either the particle size or the number of fisheyes that may result in a finally formed product. However, as is well-known, high temperature generally results in the production of a material of reduced strength and, therefore, the temperature should be maintained at a level consistent with good molecular weight and adequate speed of the reaction. For example, lauroyl peroxide is an effective catalyst in the polymerization of vinyl chloride and excellent results are thereby obtained by operating at a temperature of about 120°–130° F. This temperature range is in most instances preferred. However, the reaction proceeds with good order at from about 105°–160° F., although about 115°–140° F. is more suitable since at about 105° F., the reaction is slow, and at temperatures of about 160° F. and above, some undesirable fusion of particles may take place.

The invention is not restricted to any particular catalyst since the reaction conditions suggested to not interfere with the activity of the catalyst and no well-recognized catalyst is known which defeats the ends of the invention. Accordingly, for example, there may be employed any of the well-known catalysts, such as benzoyl peroxide, lauroyl peroxide, dicaproyl peroxide, acetyl benzoyl peroxide, diacetyl peroxide, p-tertiary-butyl perbenzoate, tertiary butyl perlaurate, di-tertiary-butyl peroxide; organic azo compounds, such as alpha, alpha'-azodiisobutyronitrile and dimethyl alpha, alpha'-azodiisobutyrate are suitable. Each catalyst will have its optimum concentration, that is to say, a concentration sufficient to effect a substantially complete polymerization at a suitable reaction rate. The reaction proceeds without difficulty or disadvantage in the presence of any of the well-known polymerization catalysts with concentrations of 0.10–0.40 percent by weight of the monomer. However, catalyst concentrations of about 0.15–0.30 percent are more suitable because of improved reaction rate and, generally, about 0.20–0.25 percent by weight of monomer is preferred. While the effects of excessive catalyst concentration are not especially notable, it has been observed that an excess tends to produce a material of reduced heat stability, and one having slightly reduced strength characteristics which are apparently due to a reduction in molecular weight. In selecting the catalyst, especially if the end product is to be used in electrical applications where dielectric strength is a factor, care should be taken to select a catalyst which will not be detrimental in this respect and, further, it should not exert an emulsifying effect. The peroxide catalysts are preferred. Lauroyl peroxide is a suitable and especially effective catalyst.

The method by which the reaction is initiated may exert an influence upon product quality. It will be understood, however, that no particular start-up method is critical to the ends of the invention; rather, the preferred procedure seems to serve to enhance the final result. It is believed to be preferable to add the gelatin, monomer, catalyst and acid to water at ambient temperature with agitation and to effect a good dispersion thereof prior to bringing the system to reaction temperature. Other start-up procedures, such as starting with water at a temperature of the order of the reaction temperature, are also available, but, in general, "cold," i. e. ambient temperature, start-up results in a somewhat better product both as to fisheye content and particle size. It appears preferable to add and disperse the gelatin and acid for up to about one-half hour prior to the addition of the monomer, although all of the materials may be added substantially concurrently with only a short period, for example, five minutes being allowed for dispersion with little difference in the result as to particle size and fisheye production.

The reaction may be carried to one-hundred percent conversion, or substantially so, if desired, but may also be terminated short of completion as desired or as convenience of plant conditions may dictate. When the reaction is complete to the desired extent, the polymer may be separated from the remaining monomer and reaction medium by known means.

Raw material purity and contamination are quite important since important properties of the product may be adversely affected thereby. In particular, aldehydes, phenols, acetylinic compounds, iron and sodium salts, calcium, soaps, fatty acids and the like may be in the raw material or enter the system from an outside source and precautions should be taken to insure reasonable to maximum purity at all times.

Various acids may be utilized to effect the desired pH value, the prominent controlling factor in its selection being that it should not impair dielectric properties. Thus, acids such as sulfuric, hydrochloric, phosphoric and acetic are suitable, phosphoric acid being preferred.

The water-monomer ratio in the system is not critical. This ratio may vary from about 1.75–4:1. More suitable, however, due to decrease in volume to be handled, is a water-monomer ratio of about 1.90–3:1, the preferred ratio being about 1.90–2.25:1. All of these ratios are volume ratios.

In order that those skilled in the art may better understand the invention and a method by which the same may be carried into effect, the following specific examples are offered:

EXAMPLE I

Formulation

The following approximate quantities of materials are provided: about 33.3 gallons of deionized, deaerated water, about 16.7 gallons of purified vinyl chloride, about 0.250% (by weight of monomer) of lauroyl peroxide, about 0.300% (by weight of monomer) of gelatin obtained by alkali hydrolysis and about 20 ml. of 85% phosphoric acid.

Procedure

About 31 gallons of deaerated water are charged to a glass-lined jacketed reactor, the water being at room temperature. A vacuum of about 27 inches of mercury is pulled on the reactor and vinyl chloride monomer introduced to the reactor to bring it back to atmospheric pressure. The vacuum treatment is repeated and more vinyl chloride monomer is introduced to the reactor. Phosphoric acid is now added and dispersed by agitation. Gelatin dissolved in a small amount of deaerated water is added. The system is now agitated for a period of about 30 minutes to secure good dispersion. The catalyst is now charged, followed by charging of the monomer. All valves are then closed, the agitator started to turn at about 250 R. P. M., and the reactor is brought to about 125° F. over about the next two hours and there maintained until the reaction is complete. The system is, of course, under pressure at this point and the pressure remains constant until the reaction is at about 80 percent conversion, at which point a sharp and distinct pressure drop occurs of about 2 to 5 pounds. When this pressure drop occurs, cold water is then delivered to the jacket and the system is cooled rapidly to about room temperature. The charge is then blown to a centrifuge and there spun as dry as possible, after which it is washed with about four displacements of water. The mass is then again spun dry, after which it is delivered to trays for final drying. It is then a finished material, ready for processing.

EXAMPLE II

Formulation

The following quantities of materials are provided: 33 gallons of deionized deaerated water, 16.7 gallons of purified vinyl chloride monomer, 0.25% (by weight of monomer) of lauryl peroxide, 0.3% (by weight of monomer) of gelatin obtained by alkali hydrolysis and about 20 ml. of 36% HCl.

Procedure

The procedure described in Example I is followed in this example and a product comparable in substantially all respects is obtained.

EXAMPLE III

Formulation

The formulation in this example is comparable to that of Example II, except that 20 ml. of 95% acetic acid are substituted for the hydrochloric acid of Example II.

Procedure

The procedure of Example I is followed and a product substantially comparable to that obtained in Example I is obtained.

The polymer particles obtained in accordance with the practice of the present invention are characterized by highly porous structure which enhances their ability to accept plasticizer upon further processing. A typical screen analysis of the product of the method of this invention is as follows:

| Screen: | Percent |
|---|---|
| On 40 mesh | 0 |
| On 60 mesh | 2 |
| On 100 mesh | 65 |
| On 200 mesh | 90 |

Those skilled in the art will recognize that this size range provides excellent uniformity of particle size well within the limits permissible by processing methods. Accordingly, the products formed from the polymer are entirely free of the disadvantages mentioned hereinbefore relating to problems that are encountered because of excessive quantities of particles that are too large or too small.

The polymer has excellent dry-blending qualities. For example, it may be mixed with any of the well-known plasticizers, both monomeric and polymeric types, without any tendency to become sticky or syrupy. Examples of such plasticizers are dioctyl pthalate and the polyesters formed by condensation of polyhydric alcohols and dibasic acids, as well as epoxidized unsaturated polyesters.

Products which are formed from granular polymeric material produced as in the above example exhibit outstanding properties in all respects. Because of the substantial absence of large fisheyes and the very small quantity of small fisheyes, sheets, films and other finished products are unusually strong. Likewise, such products are of excellent clarity.

While the invention has been described with particular reference to the production of polyvinyl chloride, it may be employed also in the production of polyvinyl chloride copolymers, especially copolymers in which vinyl chloride constitutes at least 85% of the mixture of monomeric materials. Thus, the process of the invention is applicable to processes wherein vinyl chloride is polymerized with other unsaturated monomeric material, such as vinyl esters of carboxylic acids, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid; vinyl aromatic compounds, for example, styrene, orthochlorostyrene, parachlorostyrene, 2,5-dichlorostyrene, 2,4-dichlorostyrene, paraethyl styrene, divinyl benzene, vinyl naphthalene, alpha-methyl styrene; dienes, such as butadiene, chloroprene; amides, such as acrylic acid amide, acrylic acid anilide; nitriles, such as acrylic acid nitrile; esters of a,B-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like. The process of the invention is also applicable to vinyl halides broadly, e. g., vinyl chloride, vinyl bromide, etc.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

I claim:
1. The process for producing high quality polymer which comprises suspending in water an ethylenically-unsaturated monomer containing at least 85% by weight vinyl chloride with the aid of about 0.10% to 0.45% of gelatin based on the weight of said monomer, adding an acid to lower the pH of the aqueous polymerization medium below the isoelectric point of the said gelatin and polymerizing said monomer with the aid of heat and a polymerization catalyst while maintaining the pH of the thus-formed suspension below the isoelectric point of the said gelatin and within the range from about 2 to 5, inclusive.

2. The process as in claim 1 wherein gelatin obtained by alkali hydrolysis is employed.

3. A process as defined in claim 1 wherein gelatin obtained by acid hydrolysis is employed.

4. A process as defined in claim 1 wherein gelatin obtained by water hydrolysis is employed.

5. The process as defined in claim 1 wherein the said water and monomer are present in a ratio of about 1.90 to 2.25 water:1.00 monomer and the quantity of gelatin is from about 0.25% to 0.35% by weight of said monomer.

6. The process as defined in claim 1 wherein the said pH is maintained at about 2.5 to 4 and phosphoric acid is added to maintain the pH within the desired range.

7. The process as defined in claim 1 wherein the said water and vinyl chloride are present in a ratio of about 1.90 to 2.25 water:1.00 vinyl chloride, the said pH is maintained at about 2.5 to 4, the quantity of gelatin is from about 0.25% to 0.35% by weight of said vinyl chloride and the pH is maintained within the desired range by the addition of phosphoric acid to the aqueous medium.

8. The process for producing polyvinyl chloride which comprises suspending vinyl chloride monomer in water with the aid of about 0.10% to 0.45% gelatin based on the weight of monomer, and about 0.10% to 0.40% of a peroxide polymerization catalyst by weight of monomer, adding an acid to lower the pH of the aqueous polymerization medium below the isoelectric point of the gelatin and suspension polymerizing the monomer at a temperature from about 105° to 160° F. while maintaining the pH of the thus-formed suspension below the isoelectric point of the gelatin within the range from about 2 to 5, inclusive.

9. The method according to claim 8 wherein the acid is phosphoric acid.

References Cited in the file of this patent

UNITED STATES PATENTS

| 2,108,044 | Crawford | Feb. 15, 1938 |
| 2,498,792 | Cottet | Feb. 28, 1950 |
| 2,528,469 | Condo | Oct. 31, 1950 |